Nov. 20, 1973   G. GERGELY   3,773,922
METHOD FOR THE MANUFACTURE OF EFFERVESCENT TABLETS
Filed April 6, 1972
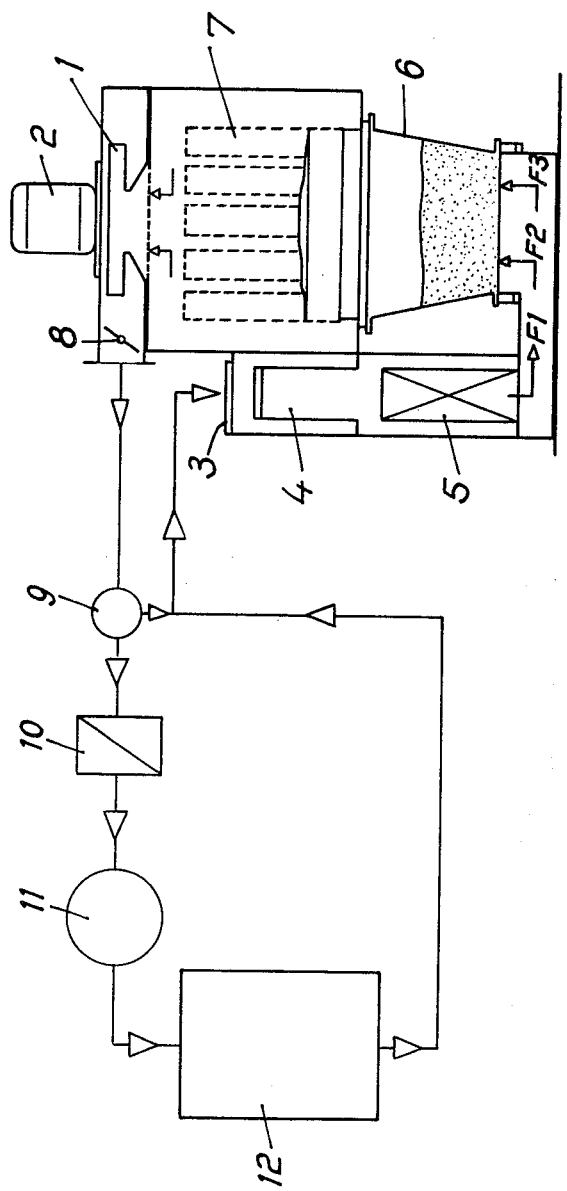

United States Patent Office 3,773,922
Patented Nov. 20, 1973

3,773,922
METHOD FOR THE MANUFACTURE OF EFFERVESCENT TABLETS
Gerhard Gergely, Vienna, Austria, assignor to Societe Francaise de Developpement et de Recherche Sofrader, Paris, France
Filed Apr. 6, 1972, Ser. No. 241,772
Claims priority, application France, Apr. 6, 1971, 12,175; Sept. 29, 1971, 7135069
Int. Cl. A61k 9/00
U.S. Cl. 424—44                                8 Claims

ABSTRACT OF THE DISCLOSURE

Method for the manufacture of effervescent tablets containing on the one hand at least one medicine, on the other hand an effervescent mixture comprising the granulation of the effervescent mixture possibly containing the medicine in three stages:
(1) the humidification of the effervescent mixture by means of a quantity of water less than 1% by weight with respect to the alkaline bicarbonate;
(2) the pre-drying of the humidified effervescent mixture in a fluidized bed, by hot air, the moisture content of which does not exceed 5 g./m.$^3$ and the temperature of which does not exceed 60° C., this operation taking place by a sequence of short drying operations so as to stop the chemical reaction; and
(3) the final drying of the granulated mixture by hot air, the moisture content of which does not exceed 5 g./m.$^3$, and the temperature of which does not exceed 60° C., in a fluidized bed, until the residual content of water in the granules is less than 0.25% by weight and, preferably comprised between 0.05 and 0.15%.

---

The present invention relates to a method for the manufacture of effervescent tablets containing:
(a) a medicine, for example acetylsalicylic acid or paracetamol, possibly in combination with absorbic acid,
(b) an effervescent mixture contituted, on the one hand, by an alkaline carbonate or bicarbonate, on the other hand, by an aliphatic polycarboxylic acid or an acid alkaline salt of such an acid,
(c) possibly customary ingredients such as binding agents, sweetening agents, flavouring agents, colouring agents.

The customary manufacture of effervescent tablets substantially comprises the following operations:
(a) the preparation of the effervescent mixture;
(b) the preparation of the active mixture containing the medicine;
(c) the combination of these two mixtures in a final mixture and the production of tablets of the latter.

More particularly, in this standard manufacture, the effervescent mixture is prepared by mixing the alkaline bicarbonate in the dry state with the aliphatic polycarboxylic acid in the form of a powder and a variable amount of water is vaporized onto the mixture obtained in order to granulate it; the grains obtained are dried in a thin layer on sieves in an oven for a period of time varying from 2 to 3 hours according to the reltaive moisture content inside this oven.

The effervescent mixture obtained is then added to the active mixture and again dried in a thin layer on sieves in an oven for 11 hours and finally made into tablets.

Now the applicant has ascertained that in the course of the granulation of the effervescent mixture by humidification, a chemical reaction takes place in this mixture between the acid and the bicarbonate with the liberation of carbon dioxide gas leading to the swelling of the grains and with the formation of water which further accelerates said reaction. Due to this, it is absolutely necessary to stop this chemical reaction as soon as possible in order to limit the deterioration of the effervescent mixture.

The method according to the invention comprises the granulation of the effervescent mixture, possibly containing the medicine, in three main stages:
(1) The humidification of the effervescent mixture possibly containing the medicine, or of one of the constituents of the said mixture by a quantity of water less than 1% by weight with respect to the alkaline bicarbonate, in order to initiate the chemical reaction between the alkaline bicarbonate and the citric acid in the presence of moisture with the liberation of carbon dioxide gas and the formation of water;
(2) The predrying of the humidified mixture, in a fluidized bed, by hot air, the temperature of which does not exceed 60° C. and the moisture content of which does not exceed 5 g. per m.$^3$, by a sequence of short drying operations each of 4 to 8 mins. by varying the speed of flow of the drying air in each operation from a maximum of approximately 6–8 m./s. to 0 m./s. at the end of said operation, and this is an order to stop the chemical reaction;
(3) The final drying of the granulated mixture, in a fluidized bed, by hot air, the temperature of which does not exceed 60° C. and the moisture content of which does not exceed 5 g./m.$^3$ at the maximum speed of flow of the drying air until the residual content of water of the granules is less than 0.25% by weight, preferably comprised between 0.05 and 0.15%.

Generally, the overall duration of the predrying and of the final drying is from 25 to 30 minutes approximately (whereas, in the customary process, the duration of drying of the effervescent mixture is approximately 11 hours) such that the chemical reaction is quickly stopped.

The effervescent mixture thus obtained is then combined with the active mixture prepared separately and the final mixture is immediately made into tablets, without any necessity to dry it again. The tablet obained dissolves in water very quickly (40 secs. to 1 min.).

The invention is illustrated by the following nonlimiting examples.

EXAMPLE 1

In this example, the manufacture of effervescent tablets of vitaminized aspirin having the following formula is described:

Formula of an effervescent tablet weighing 3.50 g.

|  | G. |
|---|---|
| Aceylsalicylic acid | 0.330 |
| Ascorbic acid | 0.200 |
| Glycocoll | 0.100 |
| Sodium bicarbonate | 1.743 |
| Anhydrous citric acid | 1.079 |
| Sodium benzoate | 0.048 |

The effervescent mixture is firstly prepared as follows, from the following ingredients:

|  | Kg. |
|---|---|
| Glycocoll (binding agent) | 7.500 |
| Sodium bicarbonate | 130.725 |
| Anhydrous citric acid | 80.925 | these ingredients having been previously passed through a sieve having a mesh size of 2 mm.

The sodium bicarbonate is introduced into a mixture of the "Lodige FKM 600 D" type equipped with anti-deposit blades and the apparatus is started for 1 min. then 1,125 ml. of demineralized water is sprayed in; then, the mixer is stopped and the citric acid and glycocoll are poured in, then the mixer is re-tarted for 3 mins. The powdery mixture becomes compact. It is removed into a carrier and dried.

DESCRIPTION OF THE DRAWING

The drier used for ths purpose is shown diagrammatically in the single figure of the accompanying drawing.

The operating process of such a drier consists of drying the granulated material in a fluidized bed by passing through it a current of hot air treated with regard to the moisture content in such a way that the product forms a suspension in the vessel. The necessary current of air is produced by a turbine 1 incorporated in the upper part of the apparatus and directly connected to a drive motor 2.

The air drawn in from outside enters at 3, the dust is removed therefrom by a preliminary filter 4 then heated by a heater 5 to the desired temperature (60° C.).

The current of air circulating in an upwards direction according to the arrows $F_1$, $F_2$ and $F_3$ through the carrier 6 containing the product to be dried, dries this granulated material in a very short time; to this end the base of the carrier is constituted by perforated sheet metal to which is fixed a stainless steel, fine mesh gauze.

By regulating the speed of flow of the air it is possible to reduce or increase the turbulence of the material to be dried. A "Nylon" filter 7 covers the carriers and prevents the escape of any fine particles of material.

After the drying operation, the filter is simply shaken, either manually or by means of an automatic device so that these particles fall into the carrier.

The air saturated with moisture passes to the outside. A part of this air is recycled by means of a recycling valve 8 via a distributor 9 and a filter 10, is mixed with fresh air supplied by a blower 11; the mixture is dried in a dehydrator 12 and is supplied at 3.

The operating procedure is as follows:

(1) The pre-drying with hot air at 60° C., in a fluidized bed, comprises:

(a) a first operation lasting 8 mins. with a speed of flow of the air decreasing continuously from 8 m./s. to 0 m./s. from the beginning to the end of the operation, with a flow of air decreasing continuously by degrees from 29 m.³/min. to 0 m.³/min.;

(b) a second operation lasting 7 minutes, with a speed of flow of the air decreasing continuously from 6 m./s. to 0 m./s. and with a flow of air decreasing continuously from 22 m.³/min. to 0 m.³/min.;

(c) a third operation lasting 4 mins., with a speed of flow of the air decreasing continuously from 5.5 m./s. to 0 m./s. and with a flow of air decreasing continuously from 20 m.³/min. to 0 m.³/min.

The filter 7 is shaken at the end of each operation.

(2) The drying with hot air at 60° C. in a fluidized bed lasts 6 mins. with a speed of flow of the drying air of 6 m./s. and with a flow of air of 22 m.²/min.

The total pre-drying and drying time of the granulated material is 25 mins.

After drying, the effervescent mixture is granulated by means of a granulator having a mesh size of 1.4 mm.

The granulated material is recovered in a container. Its water content is from 0.05 to 0.15%.

In addition, the active mixture is prepared separately from the following ingredients:

| | Kg. |
|---|---|
| Acetylsalicylic acid | 148.500 |
| Ascorbic acid | 90.000 |
| Sodium benzoate (binding agent) | 21.600 |

The acetylsalicylic acid and the ascorbic acid are passed through a sieve having a mesh size of 2 mm.

The products are then weighed and poured into a mixer. The previously sieved sodium benzoate is weighed then poured into the mixer. The mixing lasts 12 minutes.

The effervescent mixture and the active mixture are combined in a mixer and mixed for 20 min.; then the final mixture is guided towards the compression chains.

Tablets are thus obtained having a diameter of 23 mm., an average weight of 3.50 g., an average thickness of 5.561 mm., a breakage pressure of 4000 to 6000 kg. and a dissolving time of 40–60 secs.

EXAMPLE 2

For the manufacture of effervescent tablets of aspirin without vitamin C according to one of the following formulae, one proceeds as in Example 1:

Formula of an effervescent tablet weighing 3.2 g.

| | Formula without potassium ion, g. | Formula with Na/K equilibrium, g. |
|---|---|---|
| Acetylsalicylic acid | 0.330 | 0.330 |
| Sodium bicarbonate | 1.643 | 1.573 |
| Potassium bicarbonate | | 0.070 |
| Anhydrous citric acid | 1.079 | 1.079 |
| Glycocoll | 0.100 | 0.100 |
| Sodium benzoate | 0.048 | 0.048 |

Formula of an effervescent tablet weighing 3.7 g.

| | Formula without potassium ion, g. | Formula with Na/K equilibrium, g. |
|---|---|---|
| Acetylsalicylic acid | 0.500 | 0.500 |
| Sodium bicarbonate | 1.900 | 1.820 |
| Potassium bicarbonate | | 0.080 |
| Citric acid | 1.200 | 1.200 |
| Glycocoll | 0.100 | 0.100 |

EXAMPLE 3

In this example the manufacture of effervescent tablets of vitaminized paracetamol according to the following formula is described:

Formula for an effervescent tablet weighing 3 g.

| | G. |
|---|---|
| Paracetamol | 0.330 |
| Vitamin C | 0.200 |
| Sodium saccharinate | 0.003 |
| Monosodium carbonate | 1.262 |
| Monopotassium carbonate | 0.046 |
| Monosodium citrate | 0.045 |
| Sodium benzoate | 0.200 |
| Anhydrous citric acid | 0.914 |

Firstly, one proceeds to the granulation of the paracetamol from the following ingredients:

| | Kg. |
|---|---|
| Paracetamol | 24.75 |
| Monosodium carbonate | 47.325 |
| Sodium saccharinate | 0.225 |
| Purified water | 1.575 |

The sodium saccharinate is dissolved in water to obtain a moist granulated material.

The monosodium carbonate and the paracetamol are sieved separately on a sieve having a mesh size of 2 mm.

The sieved monosodium carbonate is poured into a mixer equipped with anti-deposit blades, it is wetted with the aqueous saccharinate solution and mixed for 2 minutes; the paracetamol is added to it and it is mixed for 5 minutes then the emptying flap is opened whilst the mixer rotates; the product is discharged into a carrier and dried in a fluidized bed in a drier having a current of hot air according to the procedure given in Example 1, for approximately half an hour at 60° C. The air used for the drying is previously treated in an appropriate device, so as to reduce its humidity rate to a value of less than 5 g./m.³.

When the mixture is dry, it is calibrated by means of a granulator using a grid having a mesh size of 1.40 mm. Thus the mixture No. 1 is obtained (72.300 kg.).

One then proceeds to the granulation of the effervescent mixture and of the paracetamol with the following ingredients:

| | Kg. |
|---|---|
| Monosodium carbonate | 47.325 |
| Monopotassium carbonate | 3.450 |
| Monosodium citrate | 3.375 |
| Anhydrous citric acid | 68.550 |
| Mixture No. 1 | 72.300 |
| Distilled water | 0.500 |
| 90° ethanol | 0.500 |

The monosodium and monopotassium carbonates are sieved through a sieve having a mesh size of 2 mm.

They are placed in a high capacity mixer equipped with anti-deposit blades. The mixer is allowed to turn, then the distilled water and ethanol are added, it is allowed to turn for 5 minutes. Mixture No. 1 is then added and mixed for two minutes. The previously sieved monosodium citrate and anhydrous citric acid are poured in and briefly mixed. The mixer is operated for 2 minutes.

The mixture is poured into a carrier and is dried in a fluidized bed, in a drier having a current of hot air according to the procedure described in Example 1 at 60° C. for approximately ½ hour until the quantity of water is no greater than 0.20%.

The mixture is thus calibrated as previously by means of a granulator using a grid with a mesh size of 1.4 mm., 195 kg. of mixture No. 2 are obtained.

The final mixture is thus prepared as follows:

15 kg. of vitamin C and 15 kg. of sodium benzoate lubricant previously sieved on a sieve with a mesh size of 1 mm. are poured into a cubic mixer, mixture No. 2 is then added and the mixer operates for 20 mins.; 225 kg. of the final mixture are obtained.

The final mixture is distributed in the hoppers of compressing machines to give tablets weighing 3.00 g. (75.000 tablets) of 23 mm. diameter, 5.10 mm. average thickness, having a breaking pressure greater than 3 kg. and a dissolving time of less than 2 mins.

EXAMPLE 4

In order to manufacture effervescent tablets of paracetamol (without vitamin C) according to the following formula, on proceeds as in Example 3:

Formula of an effervescent paracetamol tablet without vitamin C

| | g. |
|---|---|
| Paracetamol | 0.330 |
| Potassium bicarbonate | 0.042 |
| Sodium bicarbonate | 1.170 |
| Anhydrous citric acid | 0.914 |
| Anhydrous monosodium citrate | 0.045 |
| Sodium saccharinate | 0.003 |
| Sodium benzoate | 0.200 |
| | 2.704 |

What is claimed is:

1. Method for the manufacture of effervescent tablets containing at least one medicine and an effervescent mixture constituted by at least one alkaline bicarbonate and one aliphatic polycarboxylic acid or one alkaline metal acid salt of said acid and optionally containing ingredients such as binding agents, sweetening agents, compression lubricants, said process being characterised in that it comprises the granulation of the effervescent mixture possibly containing the medicine in three stages:

(1) the humidification of the effervescent mixture by means of a quantity of water less than 1% by weight with respect to the alkaline bicarbonate in order to initiate the chemical reaction between said bicarbonate and said acid in the presence of moisture, with the liberation of carbon dioxide gas and the formation of water;

(2) the predrying of the humidifying effervescent mixture, in a fluidized bed, by hot air, the moisture content of which does not exceed 5 g./m.$^3$ and the temperature of which does not exceed 60° C., this operation taking place by a sequence of short drying operations in order to stop the chemical reaction; and (3) the final drying of the granulated mixture by hot air, the moisture content of which does not exceed 5 g./m.$^3$, and the temperature of which does not exceed 60° C., in a fluidized bed, until the residual water content of the granules is less than 0.25% by weight and, preferably, comprised between 0.05 and 0.15%.

2. Method according to claim 1, characterised in that the predrying of the humidified, effervescent mixture, in a fluidized bed, by hot air comprises a sequence of brief fluidization operations each of 4–8 mins., the speed of flow of the drying air varying in each operation from a maximum of 6–8 m./s. approximately to 0 m./s. at the end of said operation.

3. Method according to claim 1, characterised in that the final drying of the granulated mixture by hot air at a temperature not exceeding 60° C., in a fluidized bed, is carried out at the maximum speed of flow of the drying air of 6–8 m./s. approximately.

4. Method according to claim 1, characterised in that the total duration of the predrying and of the final drying is from 25 to 30 mins. for an initial grain size of the effervescent mixture not exceeding 2 mm.

5. Method according to claim 1, characterised in that the medicine is acetylsalicylic acid or acetylsalicylic acid, combined with ascorbic acid.

6. Method according to claim 1, characterised in that the medicine is paracetamol or paracetamol combined with ascorbic acid.

7. Method according to claim 6, characterised in that it comprises the following stages:

(1) the granulation of the paracetamol with at the most half the alkaline bicarbonate (a) by humdification by means of a quantity of water less than 3.5% by weight with respect to the carbonate, and this by moistening and firstly mixing the carbonate then the paracetamol with an aqueous solution of sodium saccharinate, (b) by predrying and drying the humidified mixture, in a fluidized bed, by a current of hot air at a temperature not exceeding 60° C., and having a moisture content not exceeding 5 g./m.$^3$, for approximately ½ hour.

(2) the granulation of the paracetamol thus treated with the effervescent mixture (a) by humdification of the remaining alkaline bicarbonate mixture with a quantity of a wetting liquid less than 5% by weight with respect to the bicarbonate, mixing of the moistened mixture firstly with the granulated paracetamol, then with the monosodium citrate and the anhydrous citric acid, the wetting liquid may be either water, or a mixture of ethanol or acetone with water in proportions ranging from 30 to 70% and (b) by predrying and drying of the mixture in a fluidized bed, by a current of hot air at a temperature not exceeding 60° C. and having a moisture content not exceeding 5 g./m.$^3$ for ½ hour approximately until the water content is no greater than 0.2%.

(3) the incorporation of sodium benzoate or vitamin C and mixtures thereof with the granulated paracetamol and effervescent mixture to form the final mixture which is made directly into tablets.

8. Method according to claim 5, characterised in that it comprises the following stages:

(1) the granulation of the effervescent mixture (a) by humidification of said mixture by a quantity of water less than 1% by weight with respect to the alkaline bicarbonate, (b) by predrying and drying the humidified mixture in a fluidized bed, by a current of hot air at a temperature not exceeding 60° C. and having a moisture content not exceeding 5 g./m.$^3$ for approximately ½ hour, (2) the preparation of an active mixture in the dry state containing acetylsalicylic acid and possibly ascorbic acid, (3) the combination of the granulated effervescent mixture and of the active mixture in a final mixture and the making of tablets from said final mixture.

References Cited
UNITED STATES PATENTS

| | | | |
|---|---|---|---|
| 1,450,865 | 4/1923 | Pelc | 424—44 X |
| 3,653,914 | 4/1972 | Schmitt | 99—78 |

SHEP K. ROSE, Primary Examiner

U.S. Cl. X.R.

34—12; 99—78; 264—118; 252—188.3; 424—230, 280